United States Patent [19]

Peck

[11] 4,410,605
[45] Oct. 18, 1983

[54] THERMAL GALVANIC CELLS

[75] Inventor: Robert L. Peck, Windham Center, Conn.

[73] Assignee: Kali, Inc., Lebanon, Conn.

[21] Appl. No.: 314,519

[22] Filed: Oct. 26, 1981

Related U.S. Application Data

[63] Continuation of Ser. No. 129,417, Mar. 12, 1980, abandoned, which is a continuation-in-part of Ser. No. 959,058, Sep. 9, 1978, Pat. No. 4,211,828.

[51] Int. Cl.³ .............................................. H01M 6/36
[52] U.S. Cl. ...................................... 429/11; 429/50; 429/112
[58] Field of Search ........................... 429/11, 112, 50

[56] References Cited

U.S. PATENT DOCUMENTS

| | | | |
|---|---|---|---|
| 2,882,329 | 4/1959 | Liebhofsky | 429/11 |
| 3,253,955 | 5/1966 | Clampitt et al. | 429/11 |
| 3,508,968 | 4/1970 | Ovshinsky | 429/11 |
| 4,211,828 | 7/1980 | Peck | 429/11 |

Primary Examiner—LeFevour

[57] ABSTRACT

The efficiency of thermal galvanic cells is enhanced by establishing a temperature gradient along the electrodes, in addition to the temperature gradient between the electrodes, and/or by optimizing electrode geometry. Optimization of electrode geometry may comprise segmenting the electrodes while retaining the desired total electrode area or controlling the depth of immersion of the electrodes into the electrolyte. Further performance improvement may be obtained through the addition of a silica containing material and/or a thermal barrier to the electrolyte.

24 Claims, 19 Drawing Figures

THERMAL GALVANIC CELLS

CROSS-REFERENCE TO RELATED APPLICATIONS

This application is a continuation of application Ser. No. 129,417, filed Mar. 12, 1980, now abandoned which is a continuation-in-part of Ser. No. 959,058 filed Sept. 9, 1978 now U.S. Pat. No. 4,211,828.

BACKGROUND OF THE INVENTION (1) Field of the Invention

This invention relates to cell-type devices characterized by a pair of electrodes separated by an electrolyte and particularly to thermal galvanic cells. More specifically, this invention is directed to the conversion of thermal energy into electrical energy. Accordingly, the general objects of the present invention are to provide novel and improved methods and apparatus of such character.

(2) Description of the Prior Art

While not limited thereto in its utility, the present invention is particularly applicable to the conversion of thermal energy into electrical energy and especially to thermal galvanic cells for effecting such energy conversion. The present state of the art with regard to thermal galvanic cells is believed to be exemplified by the disclosure of U.S. Pat. No. 4,211,828. The disclosure of the said U.S. Pat. No. 4,211,828 is hereby incorporated herein by reference.

The cells of the referenced patent represent a significant step forward in the art of thermoelectric energy systems. These improved cells are characterized by a pair of electrodes which are separated by an electrolyte. The generation of current by the cell is induced through the establishment of a temperature gradient across the cell and specifically by causing the two electrodes to assume different temperatures.

There is, of course, an ever present desire to enhance the efficiency of all devices and this is particularly true in the case of energy conversion and especially those devices or systems wherein electrical energy is directed produced from thermal energy. In the case of the cells of the referenced patent, enhanced performance may be measured in terms of electrode efficiency. Electrode efficiency, as this term is employed herein, is the electrode/electrolyte interfacial resistivity. Cell efficiency is defined as the electrical output power divided by the thermal power input. Cell performance may be measured in terms of the cell resistance per unit area of electrode (ohm cm²). The latter quantity, while not resistivity in the classical sense; i.e., not ohm cm; will be referred to as such herein and will mean the externally measured resistance of the cell multiplied by the area of one of the electrodes. The open circuit voltage, V, of a thermal galvanic cell of the type being discussed is a function of the temperature difference between a pair of oppositely polarized electrodes. The open circuit voltage may be obtained by multiplying temperature difference by the "Seebeck" coefficient. The "Seebeck" coefficient is also known as the thermal galvanic cell constant of thermoelectric power, in common usage, is defined as the change in open circuit voltage per degree Celsius expressed as mv/°C. The output power which may be derived from a thermal galvanic cell may be expressed as:

$$P = I^2 R \quad (1)$$

where:
R is the load resistance; and
I may be expressed as:

$$I = \frac{V}{Ri + R} \quad (2)$$

where:
V is the open circuit voltage; and
Ri is the internal cell resistance as per Thevenin's theorem. For maximum power output, as can be proven by maximizing the derivative of P with respect to R, Ri must be equal to R. Combining equations (1) and (2) above:

$$P = V^2/4Ri \quad (3)$$

The open circuit voltage for a thermal galvanic cell is:

$$V = (S)(dT_1) \quad (4)$$

where:
S is the Seebeck coefficient; and
$dT_1$ is the temperature difference between the two electrodes.

Therefore, equation (3) above reduces to:

$$P = (SdT)^2/4Ri \quad (5)$$

Accordingly, for any given cell with a constant Seebeck coefficient, the power output for cells of equal geometries and temperatures is a function of internal resistance only. If the power per unit area is desired, for purposes of comparison, the above definition of resistivity may be employed since, under equal temperature differentials, the voltages would be the same. In summation, the efficiency of the thermal galvanic cell of the referenced patent could be enhanced if the resistance per unit area of electrode of the cell, hereinafter the "resistivity", could be minimized.

SUMMARY OF THE INVENTION

The present invention relates to novel and improved electrical devices of the type which include at least a pair of electrodes spaced by an electrolyte. This invention also relates to methods of enhancing the efficiency of thermal galvanic cells including the cells described in the referenced patent application.

In accordance with the present invention the efficiency of a thermal galvanic cell is enhanced by establishing a second temperature gradient across one or both electrodes. This $dT_2$ is in addition to the temperature gradient, $dT_1$, utilized in prior cells of similar character. Accordingly, in one embodiment of the present invention, the thermal energy input to the "hot" electrode of a thermal galvanic cell constitutes a "point" source of heat coupled to the electrode at a central region thereof while a similar "point" source, i.e., a heat sink, was established with the "cold" electrode. This arrangement resulted in a temperature gradient across the electrodes and extending radially outwardly from the points of connection to the heat source and sink and a corresponding unexpected decrease in cell "resistivity" when compared to prior art cells constructed in the manner disclosed in the referenced patent. In accordance with a second embodiment, the electrodes extended into the electrolyte toward one another and temperature gradient $dT_2$ was established across the electrode from the external heat source and electrolyte sink; this $dT_2$ temperature gradient being in addition to the temperature differential $dT_1$ between the two electrodes. A cell constructed in accordance with this second embodiment is also characterized by reduced "resistivity" when compared to cells of the type disclosed in the referenced patent. In accordance with a further embodiment of the invention, parallel electrodes are respectively heated and cooled along first edges while the second, oppositely disposed edges are immersed in the electrolyte. This arrangement also produces a $dT_2$ temperature gradient in the direction of immersion, as well as an average $dT_1$, and results in a significant decrease in "resistivity".

Also in accordance with the present invention, the efficiency of a thermal galvanic cell may be enhanced by optimizing electrode geometry. The optimization of electrode geometry may best be accomplished through reducing the depth of immersion of the electrodes into the electrolyte; i.e., by employing elongated electrodes that extend a short distance into an electrolyte. An improvement in performance may also be accomplished, for a given electrode area, by segmenting that area, all of the segments being electrically commoned. In both cases, the cell exhibits a decrease in "resistivity" when compared to the prior art as exemplified by the cell of the referenced patent.

The improvements described above, when combined, provide a dramatic and totally unexpected increase in cell efficiency for various electrolytes and electrode materials. This increase in efficiency may be further enhanced by adding, to the electrolyte, between 1% and 15% by weight of a silica containing material and/or by inserting a thermal barrier between the electrodes.

BRIEF DESCRIPTION OF THE DRAWING

The present invention may be better understood and its numerous objects and advantages will become apparent to those skilled in the art by reference to the accompanying drawing wherein like reference numerals are employed to refer to like elements in the several FIGURES and in which:

FIGS. 3A and 3B illustrate an improvement to the cell of FIG. 1 in accordance with a second feature of the present invention; FIG. 3 depicting a segmented electrode;

DESCRIPTION OF THE PREFERRED EMBODIMENT

With reference to the drawings, a thermal galvanic cell of the type disclosed and claimed in referenced U.S. Pat. No. 4,211,828 is shown in cross-section in FIG. 1. The cell of FIG. 1 was fabricated, for purposes of comparison with the cells of the present invention, so as to have disc-shaped electrode areas exposed to the electrolyte. The electrodes, which are indicated at 10 and 12, were clamped against an annular polytetrafluoroethylene spacer 14 and the space between the facing surfaces of electrodes 10 and 12 was filled with an electrolyte 16. Commensurate with previous practice, electrode 10 was uniformly heated to a temperature $T_{H1}$ by bringing a heated metal plate 18 into contact with the outwardly facing surface thereof. Electrode 12 was similarly caused to assume a second temperature, $T_{C1}$ by means of placing the outwardly facing side thereof in contact with a second metal plate 20. The temperature difference $dT_1$ between electrodes 10 and 12, with appropriate selection of electrolyte 16, results in the establishment of current flow through the cell and a voltage V may be measured across the cell. The cell open circuit voltage is given by equation (4) above.

Figure 1:
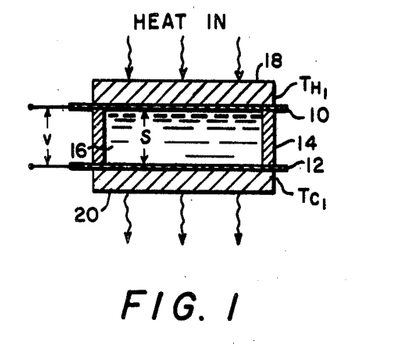
FIG. 1 is a schematic illustration of a prior art thermal galvanic cell of the type disclosed in U.S. Pat. No. 4,211,828.
Figure 2:
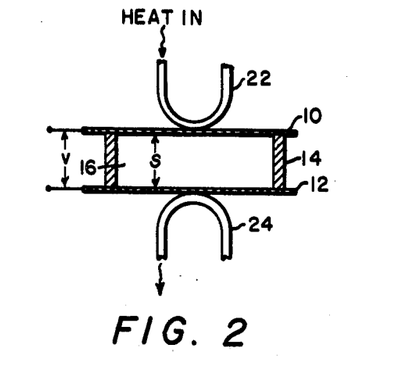
FIG. 2 is a schematic illustration of the cell of FIG. 1 modified in accordance with a first feature of the present invention.

Referring to FIG. 2, a cell in accordance with a first embodiment of the present invention is shown in cross-section. The cell of FIG. 2 differs from that of FIG. 1 only in that the metal plates 18 and 20, which respectively insure the establishment of a uniform temperature across electrodes 10 and 12, have been removed. In the FIG. 2 embodiment, a conduit 22 is attached to the center of the outwardly facing side of electrode 10 as shown while a second conduit 24 is coupled to the center of electrode 12 as shown. A "hot" fluid is circulated through conduit 22 whereby this conduit appears to electrode 10 as a point source of heat. A "cold" fluid is circulated through conduit 24 whereby conduit 24 appears to electrode 12 to be a point heat sink. Employing the arrangement of FIG. 2, there is an average temperature differential $dT_1$ between electrodes 10 and 12 and, additionally, there is a transverse temperature differential preceding radially outwardly from the points of contact of conduits 22 and 24 respectively with electrodes 10 and 12. With the temperature of the fluid flowing through conduit 22 selected so as to provide an average electrode temperature of 75° C., a radial temperature differential, $dT_2$, of 4° per centimeter was measured on a copper electrode 10 of 0.5 mm thickness. As will be explained below, the establishment of this transverse temperature differential, $dT_2$, produced an unexpected and significant increase in cell efficiency.

Figure 3A:
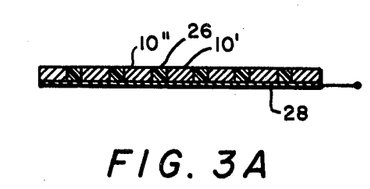
Figure 3B:
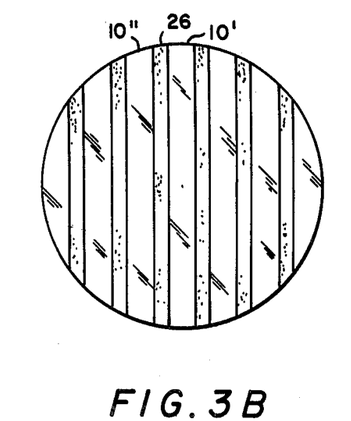

Referring jointly to FIGS. 3A and 3B, an electrode in accordance with a further embodiment of the present invention is shown on an enlarged scale. That portion of the electrode of FIG. 3 which is contacted by electrolyte 16 has been segmented. In the FIG. 3 embodiment, the electrode is formed into a plurality of strips as indicated at 10' and 10". These electrode strips are separated by any suitable non-conductive material as indicated at 26. All of the electrode strips are electrically and thermally connected to a plate 28 and the plate 28 may be heated in the same manner as depicted in FIG. 1. Employing the electrode configuration of FIG. 3 in the cell of FIG. 1, an unexpected and significant improvement in performance is achieved. This improvement in performance, which will be discussed in greater detail below in the description of FIG. 7, is evidenced by an increase in current density and it is possible to take full advantage of this phenomena by retaining the same total electrode area and dividing this area into segments which are electrically commoned.

Figure 4:
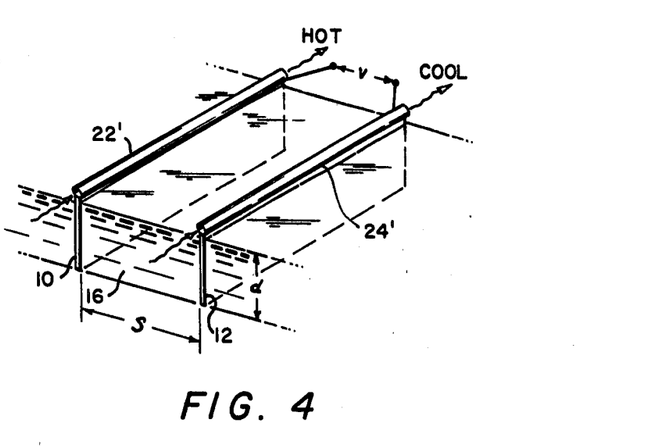
FIG. 4 is a schematic illustration of a first embodiment of a cell which incorporates the features of both of the devices of FIGS. 2 and 3.

With reference to FIG. 4, yet another embodiment of the present invention is shown schematically. As will be obvious from the discussion below, the embodiment of FIG. 4 takes advantage of the discoveries embodied in the embodiments of FIGS. 2 and 3. In FIG. 4, rather than employing the disc-shaped electrodes of FIGS. 1 and 2, the electrodes 10 and 12 are in the form of rectangular plates. In the FIG. 4 embodiment, electrode 10 is heated by means of passing a "hot" fluid through a conduit 22' attached to the electrode along one of the long edges thereof which extends above the surface of electrolyte 16. The temperature of electrode 12 is similarly controlled by means of passing a "cold" fluid through conduit 24'. This technique results in establishment of an average temperature differential $dT_1$ between electrodes 10 and 12 and a transverse temperature gradient $dT_2$ along each electrode in the direction of immersion into electrolyte 16. With the area of the electrodes 10 and 12 of the FIG. 4 embodiment which are immersed in electrolyte 16 being identical to the electrode area that is in contact with the electrolyte in the embodiments of FIGS. 1 and 2 and with the same electrode separation, S, an unexpected and very significant increase in efficiency is achieved and this increase in efficiency is maximized by reducing the depth of immersion, d, of the electrodes of the FIG. 4 embodiment into the electrolyte 16.

Figure 5A:
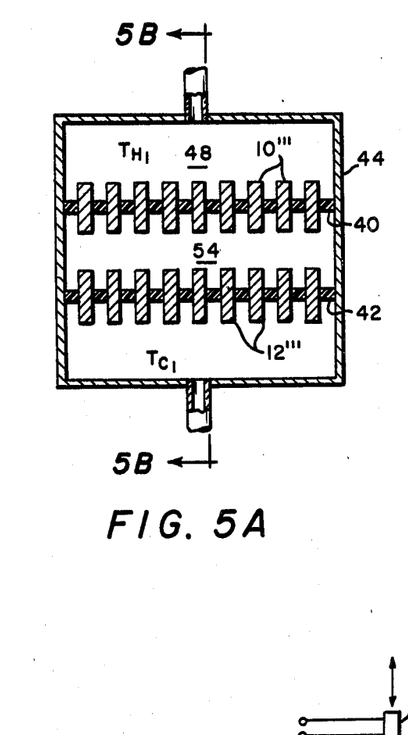
FIGS. 5A and 5B are a schematic illustration of a second embodiment of a cell which incorporates the features of both of the devices of FIGS. 2 and 3.
Figure 5B:
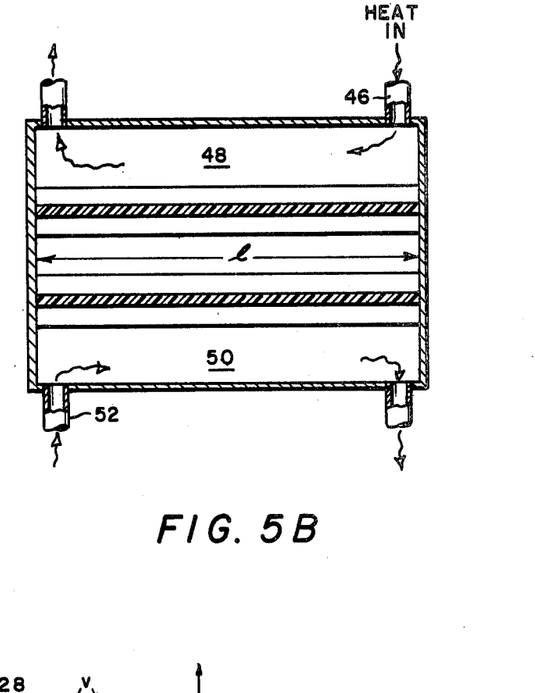
Figure 6:
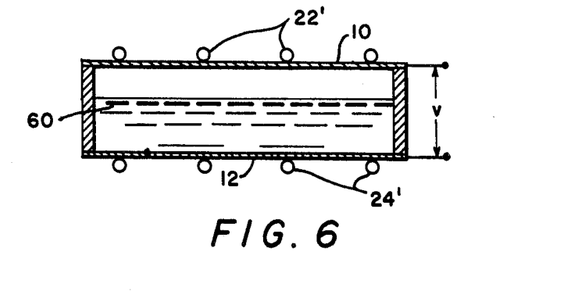
FIG. 6 is a schematic illustration of a third embodiment of a cell which incorporates the features of both of the devices of FIGS. 2 and 3.

FIGS. 5 and 6 represent further embodiments of thermal galvanic cells in accordance with the present invention. FIG. 6 is a version of the FIG. 2 cell while FIG. 5 embodies the features of the cells of FIGS. 3 and 4. Before discussing the embodiments of FIGS. 5 and 6, however, it is believed desirable to refer to the test results depicted graphically in FIGS. 7-10 inclusive. These four FIGURES are plots of cell "resistivity", in ohms per $cm^2$, versus current density, in $mA/cm^2$ on a log-log scale for the cells of FIGS. 1-4. Considering first FIG. 7, for all six different cells tested both electrodes were comprised of copper of the same thickness and the electrolyte was $CuSO_4$ adjusted to a pH of 1.4 with tartaric acid. The "hot" electrode 10 was either uniformly heated to 75° C. or had an average temperature of 75° C. while the average temperature of the "cold" electrode 12 was 24° C. In all cases the separation S between electrodes 10 and 12 was 1.9 cm and each cell was tested with load resistances of 2, 5 and 16 ohms. The "CASE" numbers indicated on FIG. 7 are commensurate with the FIGURE number of the embodiment being tested; i.e, CASE 1 is a cell of the type depicted in FIG. 1, etc. In CASES 1, 2 and 4, the area of each of electrodes 10 and 12 was ten (10) $cm^2$.

Figure 7:
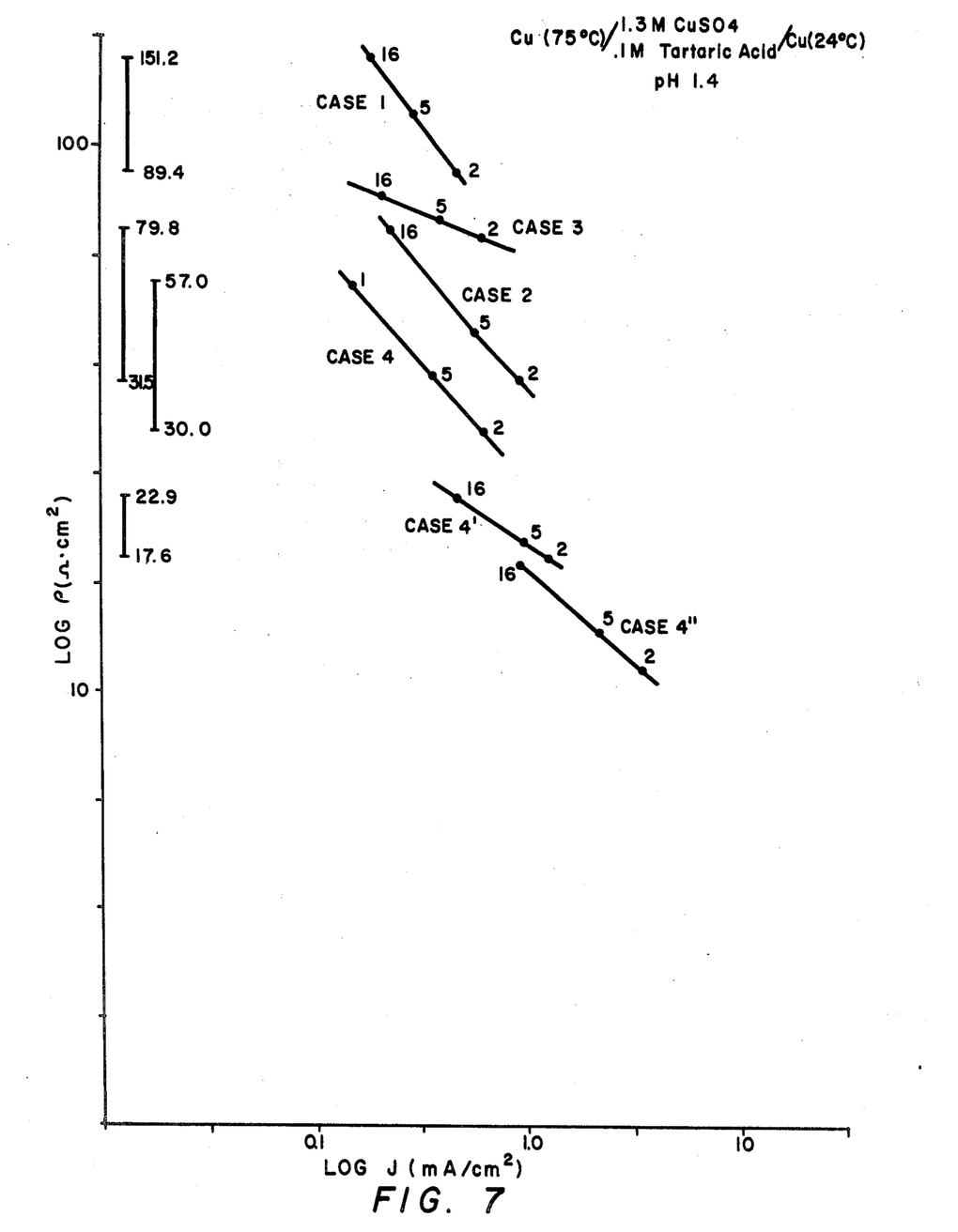
FIG. 7 is a plot of "resistivity" versus current density for the cells of FIGS. 1-4 employing a first electrolyte and electrode materials.

Continuing with a discussion of FIG. 7, the curve labeled CASE 1 was plotted from data derived from measurements taken on the cell of FIG. 1. The data was obtained by varying the load resistance across the cell and then calculating the cell parameters from the known open circuit voltage and the measured voltages at the specified load resistance. The higher values of "resistivity" are at the higher load resistances and, of course, the lower current density.

The curve indicated as CASE 2 was obtained with a cell constructed as shown in FIG. 2; i.e., the cell geometry was identical to that of FIG. 1; but a radial temperature gradient established at each electrode. In the test being described, the measured $dT_2$ was approximately 4° C./cm and the average temperature difference between the electrodes, $dT_1$, was maintained the same as in CASE 1. With all of the geometries and parameters being maintained the same, it can be seen from FIG. 7 that the FIG. 2 embodiment, and particularly the establishment of a transverse temperature gradient, resulted in a dramatic decrease in cell resistivity and an increase in current density.

Proceeding to the curve labeled CASE 3, the electrodes of FIG. 3 were substituted for the copper discs of FIG. 1 and, with all other parameters remaining the same, it may be seen that the segmented electrode also produces a decrease in cell "resistivity" and an increase in current density when compared to the prior art cell of FIG. 1.

Continuing with a discussion of FIG. 7, the curve labeled CASE 4 was obtained from a cell having the configuration depicted in FIG. 4; i.e., the cell of FIG. 4 has rectangular electrodes of the same area as the cells of FIGS. 1 and 2 and the same average $dT_1$ was established across the cell. Because of the manner in which heat was delivered to electrode 10 and removed from electrode 12, this resulted in a temperature gradient $dT_2$ in the direction of immersion of approximately 15° C./cm. As may be seen from FIG. 7, the cell configuration of FIG. 4 produces a very significant improvement in cell efficiency when compared to the prior art embodiment of FIG. 1 and also provides an improvement when compared to the embodiments of FIGS. 2 and 3. This improvement is believed to be attributable to the transverse temperature differential $dT_2$ and also partly to the change in electrode shape. The curve for CASE 4 was obtained with a cell having electrodes which were 10 cm in length and which extended into the electrolyte to a depth of 1 cm.

Further improvement, in terms of both lowered "resistivity" and increased current density, was achieved by taking the cell of FIG. 4 and decreasing the depth of immersion of the electrodes while maintaining all other parameters constant. Thus, the data from which the curve labeled CASE 4' was plotted was measured on a cell identical to that of FIG. 4 with the exception that the depth of immersion of the electrodes was reduced to 0.3 cm. This constitutes proof of the unexpected phenomena, which will be further discussed below in the descriptions of FIGS. 11-15, that cell "resistivity" per unit of electrode area is decreased and current density per unit area increased through reduction of electrode immersion depth in a thermal galvanic cell. A further improvement in cells of the type described above, from which the curve for CASE 4' was plotted, results from the addition of a limited quantity; i.e, between 1% and 15% by weight; of a silica containing material to the electrolyte. Thus, the data from which the curve labeled CASE 4" was plotted was obtained from measurements on the same cell as tested with CASE 4' with 5% by weight of the material known in the art as Cab-o-Sil having been added to the electrolyte. The material known as Cab-o-Sil consists of sub-micron sized $SiO_2$ particles. While the manner in which Cab-o-Sil functions is not entirely understood, it causes the electrolyte to gel and may reduce convection currents within the electrolyte while promoting the creation of hot spots at the surface of the "hot" electrode 10. The effects of the silica containing material will be further described below.

Figure 8:
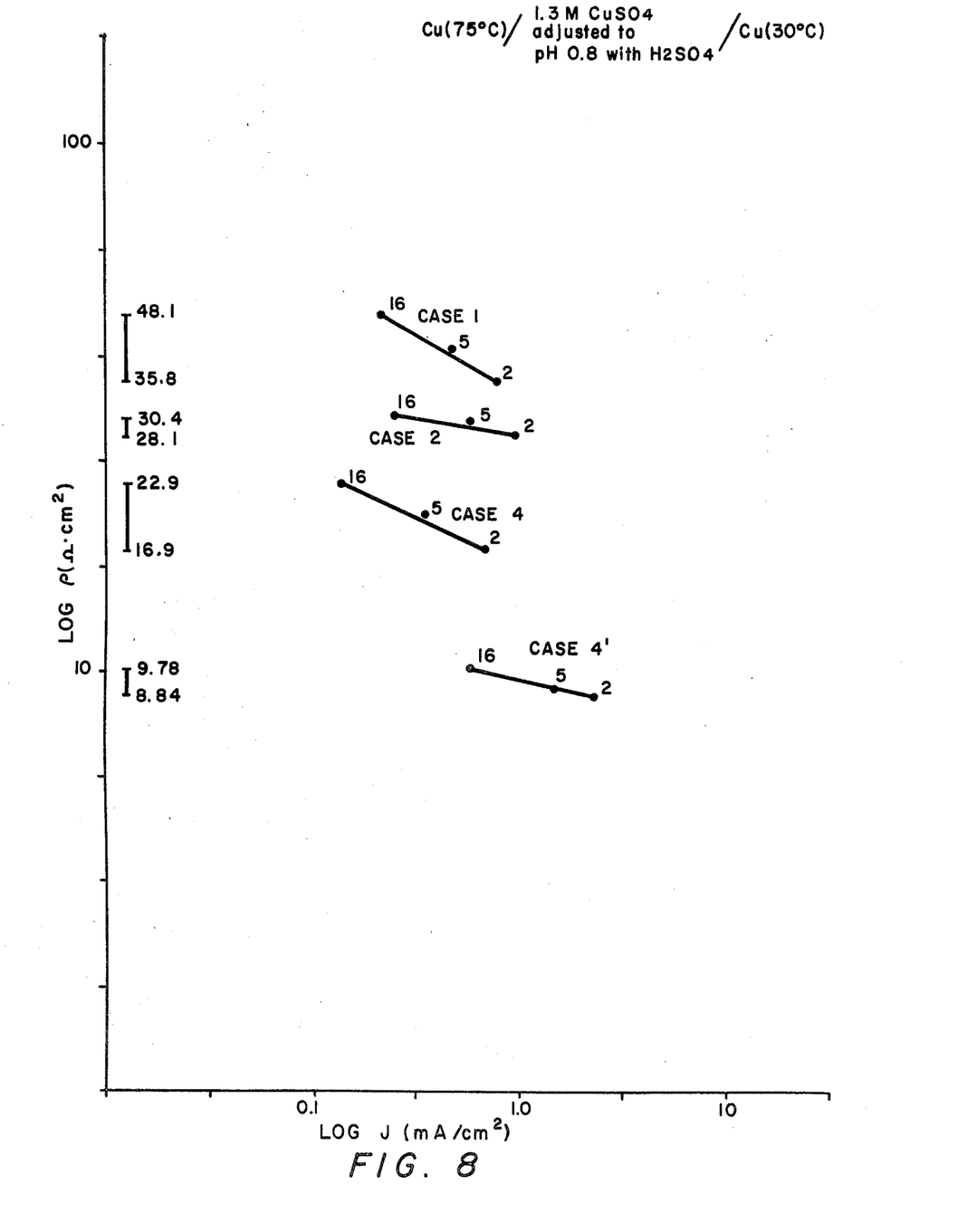
FIG. 8 is a plot similar to FIG. 7 demonstrating the use of a second electrolyte.

FIG. 8 depicts a series of curves representing data obtained in the manner described above with cells constructed in accordance with FIGS. 1, 2 and 4. However, in obtaining the data for FIG. 8, a different electrolyte was employed and the temperature of the "cold" electrode was maintained slightly above that of the previously reported tests (FIG. 7). Specifically, the pH of the cells from which the FIG. 8 data was derived was achieved by employing $H_2SO_4$ rather than tartaric acid. It may be seen from FIG. 8 that creation of either a radial $dT_2$ temperature gradient (CASE 2) or a transverse $dT_2$ temperature gradient coupled with a change in electrode geometry (CASE 4) results in the cell "resistivity" being decreased when compared to the prior art (CASE 1). FIG. 8, and this is also true of FIGS. 9 and 10 to be described below, thus further shows that electrode efficiency in a thermal galvanic cell can be increased by establishing a temperature gradient across the surface of an electrode or the electrodes. In each of FIGS. 7–10, during the testing of the prior art cells identified as CASE 1, heat was applied uniformly over the surface of the "hot" electrodes and thus there were no measurable transverse temperature gradients. However, when heat is added and removed at a point in the center of each electrode to develop a radial heat flow over the electrode, thereby causing a transverse temperature gradient as is the situation for the FIG. 2 embodiment (CASE 2), cell "resistivity" decreased dramatically and there was an increase in current density. In the testing of the FIG. 2 embodiment with various electrolytes, the electrode temperatures were monitored by means of thermistors mounted on the electrode surfaces. It was presumed that the average electrode temperature, for purposes of comparison with tests on a cell of the FIG. 1 configuration, occurred at a point on the radius corresponding to one-half of the electrode area. The radial temperature gradient $dT_2$ measured for all of the tests on a cell of the FIG. 2 configuration was approximately 4° C./cm. In the testing performed on the FIG. 4 embodiment, CASE 4, the measured $dT_2$ was approximately 15° C./cm and, as noted above, in each case the electrode tested was 10 cm in length with an immersion depth into the electrolyte of 1 cm. Every test on the FIG. 4 embodiment showed a significant decrease in "resistivity" when compared to the prior art as exemplified by a cell of the FIG. 1 configuration. As indicated by the curves for CASE 4', when the electrode immersion depth of the cell of FIG. 4 is decreased, there is a further reduction in "resistivity" and there is also a significant increase in current density.

Figure 9:
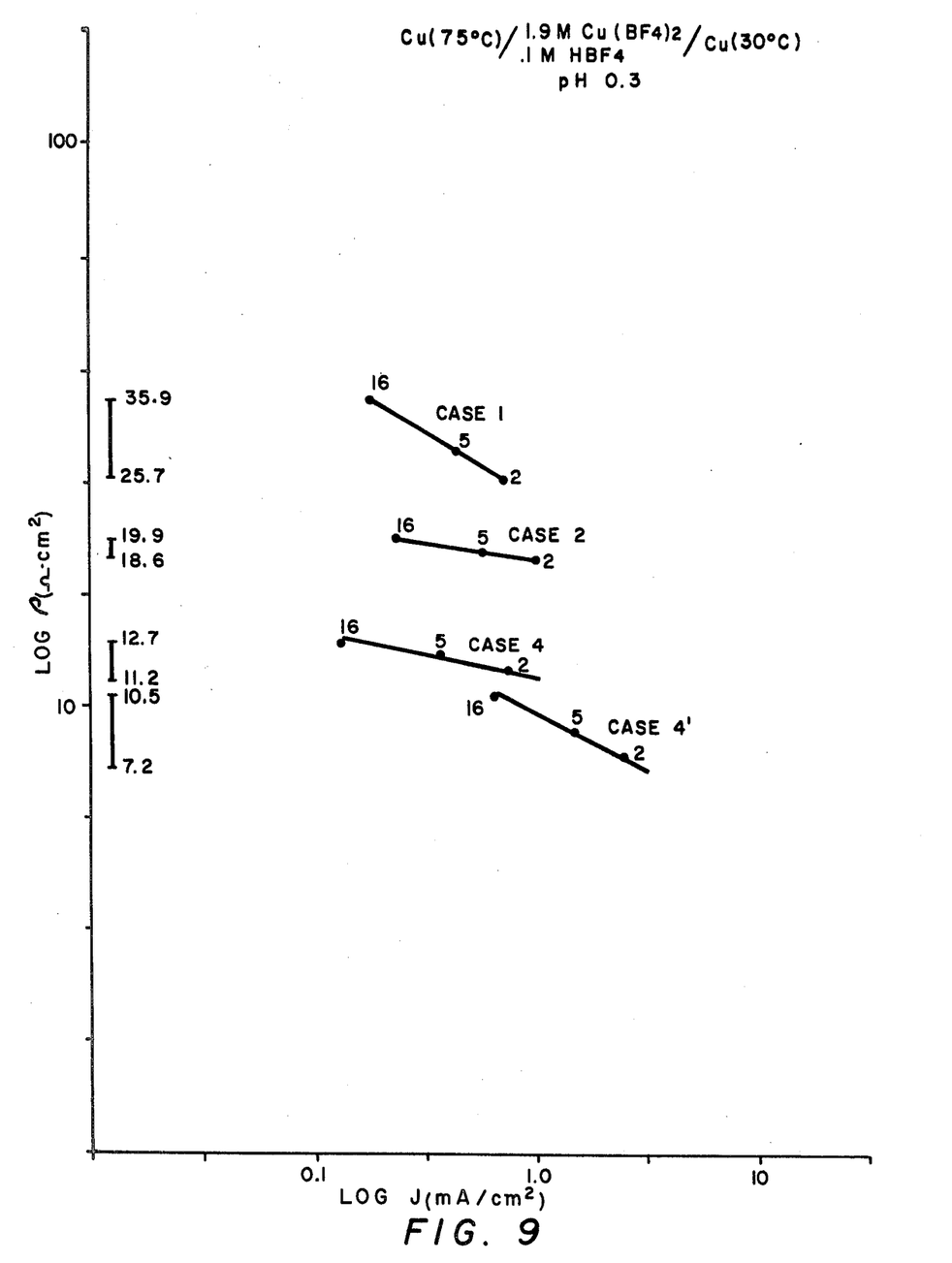
FIG. 9 is a plot similar to FIG. 7 demonstrating the use of a third electrolyte.

FIG. 9 shows the results of tests similar to that of FIGS. 7 and 8 on cells having the configuration of FIGS. 1, 2 and 4. In FIG. 9, however, a third electrolyte was utilized while all other parameters remained the same as those employed in the test results represented by FIGS. 7 and 8.

Figure 10:
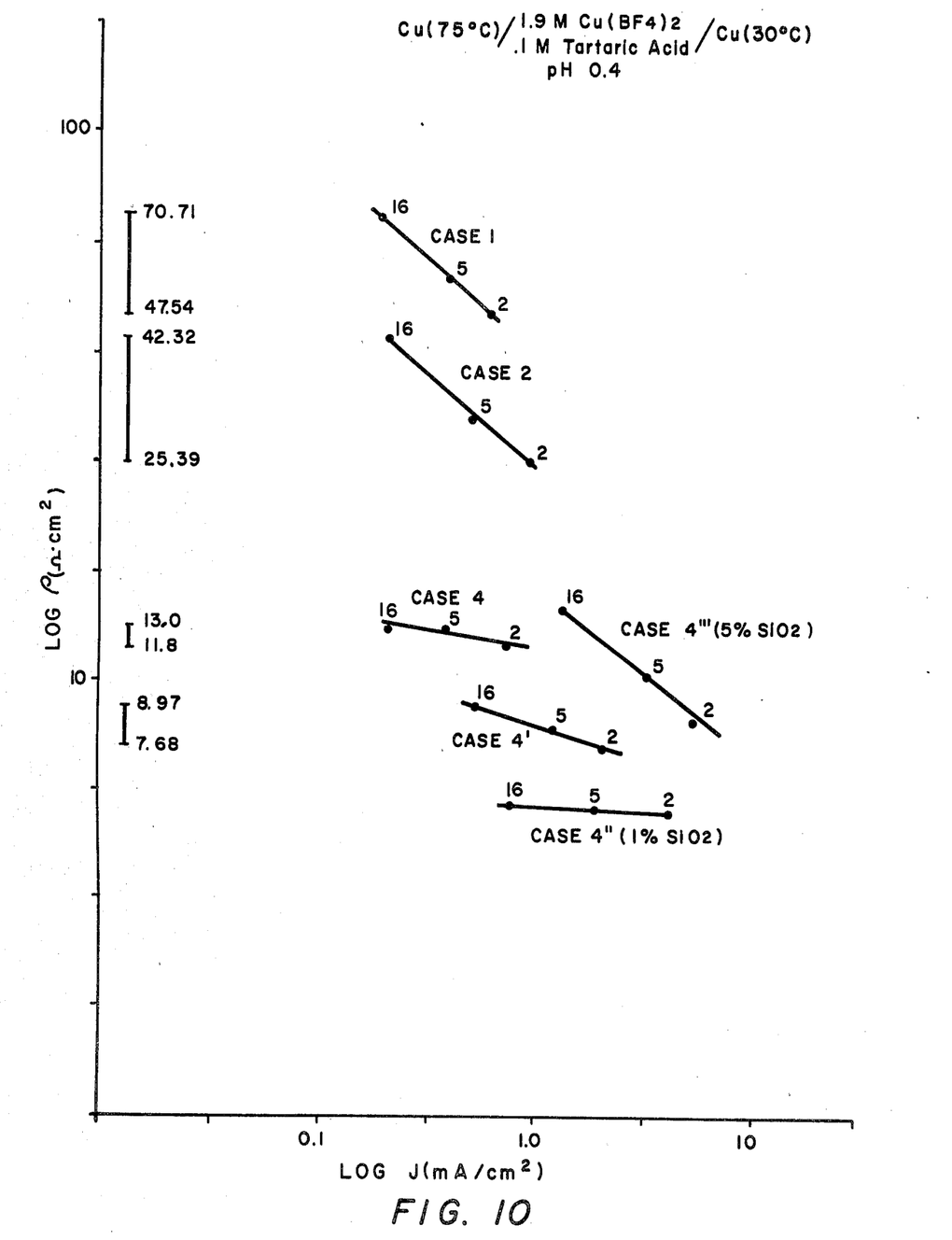
FIG. 10 is a plot similar to FIG. 7 demonstrating the use of a fourth electrolyte.

Referring to FIG. 10, the results of tests performed on cells having the configurations of FIGS. 1, 2 and 4 with a fourth electrolyte are represented. FIG. 10 depicts the totally unexpected phenomena that the addition of 1% $SiO_2$ (Cab-o-Sil) to a cell of the FIG. 4 type, wherein the electrode immersion depth has been reduced to 0.3 cm, produces a very significant decrease in "resistivity" with a modest increase in current density (CASE 4") while the addition of 5% Cab-o-Sil to the same cell (CASE 4''') causes an increase in "resistivity" and an increase in current density. With a $dT_1$ of 45° C. an electrode separation of 1.9 cm, the maximum power output obtained for each CASE is as follows:

CASE 1 = 7μ watts/cm²
CASE 2 = 16μ watts/cm²
CASE 4' = 29μ watts/cm²
CASE 4" = 52μ watts/cm²
CASE 4''' = 212μ watts/cm²

With up to 1% $SiO_2$ added to the electrolyte, and a $dT_2$, there is a decrease in "resistivity" which may result from the silicon dioxide functioning as a thermal barrier. As may be seen by comparing CASE 4" with CASE 4''', with a $dT_2$ the addition of more than 1% $SiO_2$ causes a slight increase in "resistivity" but also causes a dramatic increase in Seebeck coefficient.

Figure 16:
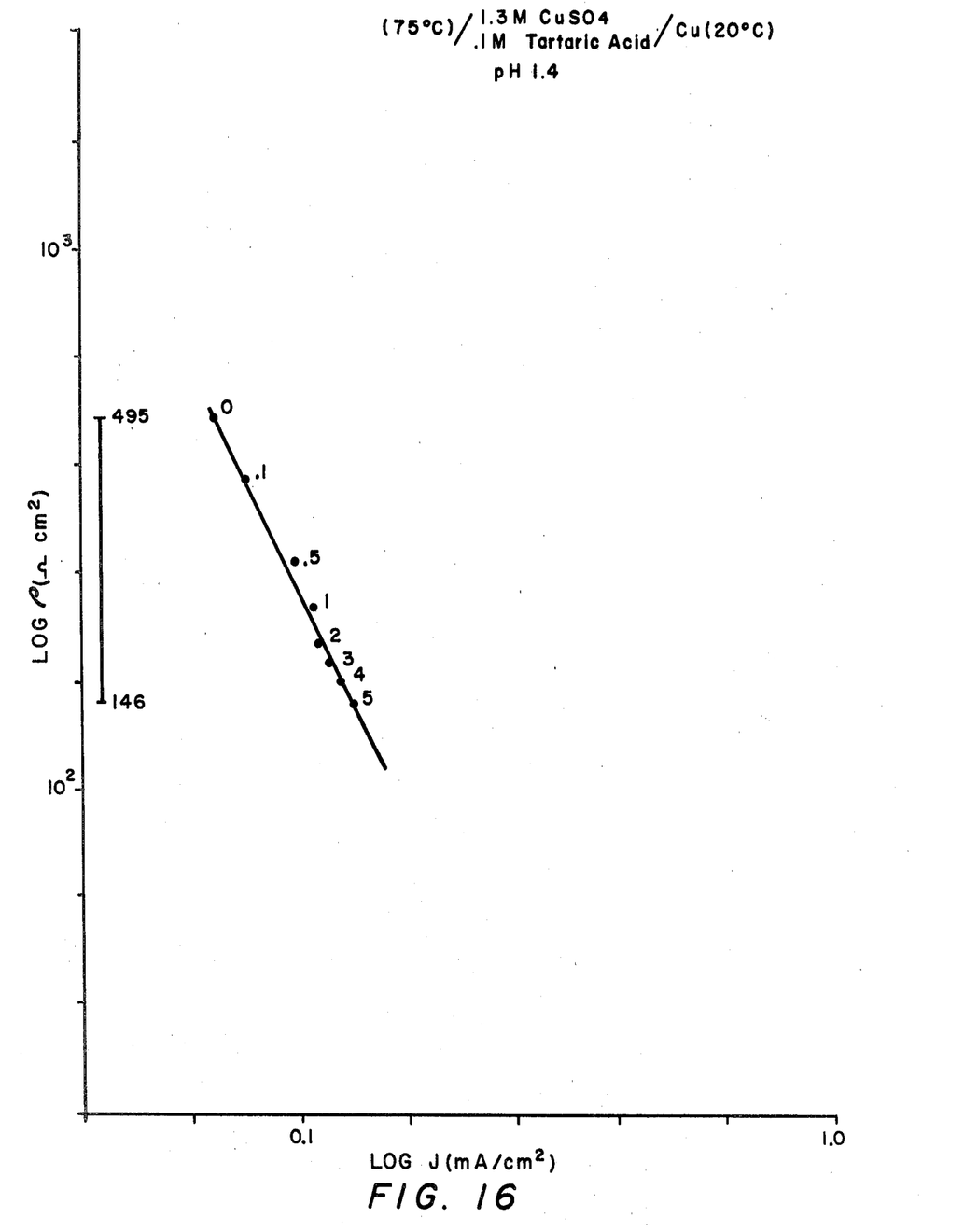
FIG. 16 depicts the decrease in "resistivity" associated with the addition of a silica containing material to the electrolyte of a prior art cell.

FIG. 16 is a log-log plot of "resistivity" versus current density for the prior art cell of FIG. 1 and the electrolyte of FIG. 7 with a $dT_1$ of 55° C., all other parameters remaining the same and being as noted above, as the percent by weight of sub-micron $SiO_2$ added to the electrolyte is increased. FIG. 16 shows that cell "resistivity" decreases and current density increases as the amount of $SiO_2$ increases without a $dT_2$. Tests have shown, however, that there is an upper limit of approximately 15% of the silica containing material. Exceeding this limit results in mechanical contact problems between the electrolyte and the electrodes.

Figure 17:
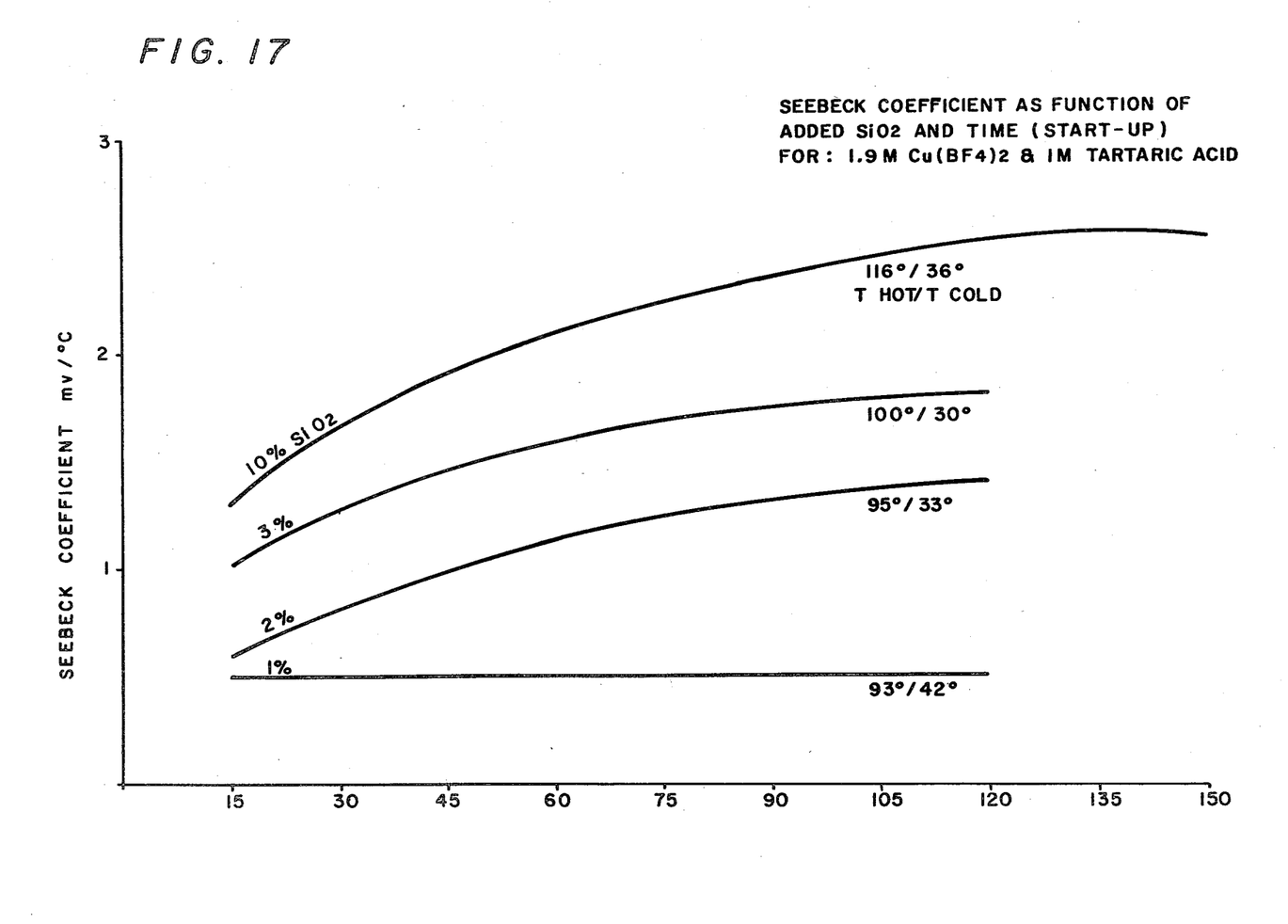
FIG. 17 shows the increase of Seebeck coefficient in a newly started cell with time for various percentages of $SiO_2$ in the electrolyte.

It is also to be noted that, with cells having the configuration depicted in FIG. 4, with a copper fluoborate electrolyte, there is a steady logarithmic increase in the Seebeck coefficient with time when up to 15% Cab-o-Sil is added to the electrolyte. Since the power output of a thermal galvanic cell is proportional to the cell voltage squared, while only directly proportional to cell conductance, a doubling of cell voltage will result in quadrupling of output power. The increase in Seebeck coefficient with time for a cell constructed in accordance with the FIG. 4 embodiment is shown on FIG. 17. The curves indicated on FIG. 10 as CASES 4" and 4''' were plotted with the cells having reached equilibrium.

Figure 11:
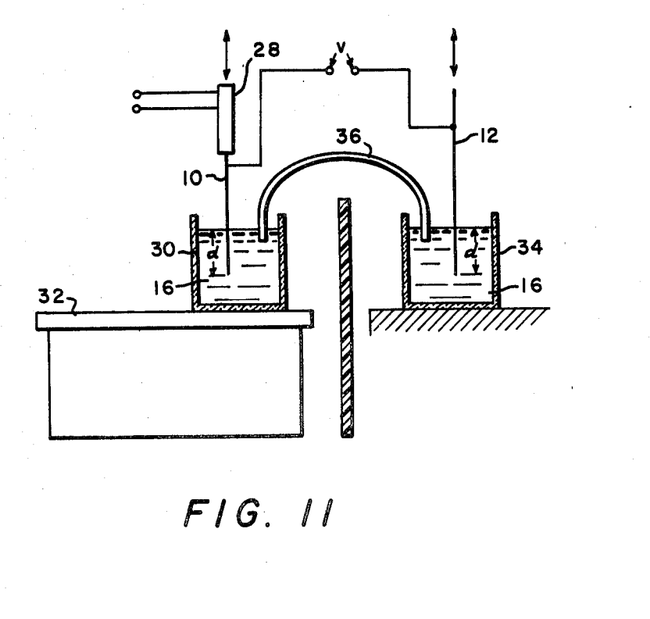
FIG. 11 illustrates the test procedure employed to demonstrate a further feature of the present invention.
Figure 12:
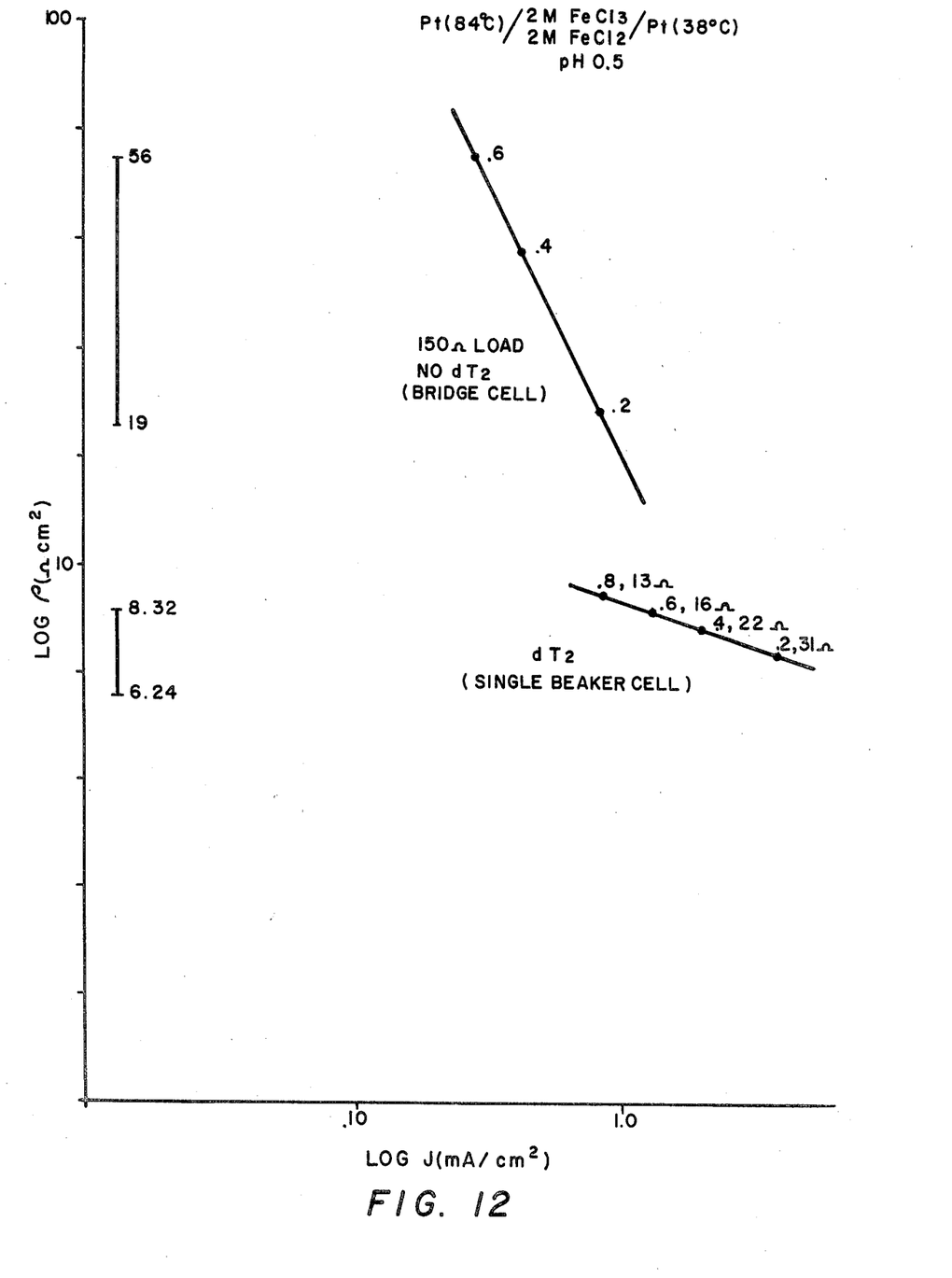
FIGS. 12-15 graphically represent the results of tests employing the apparatus of FIG. 11 with four additional electrolytes and different electrode materials.
Figure 13:
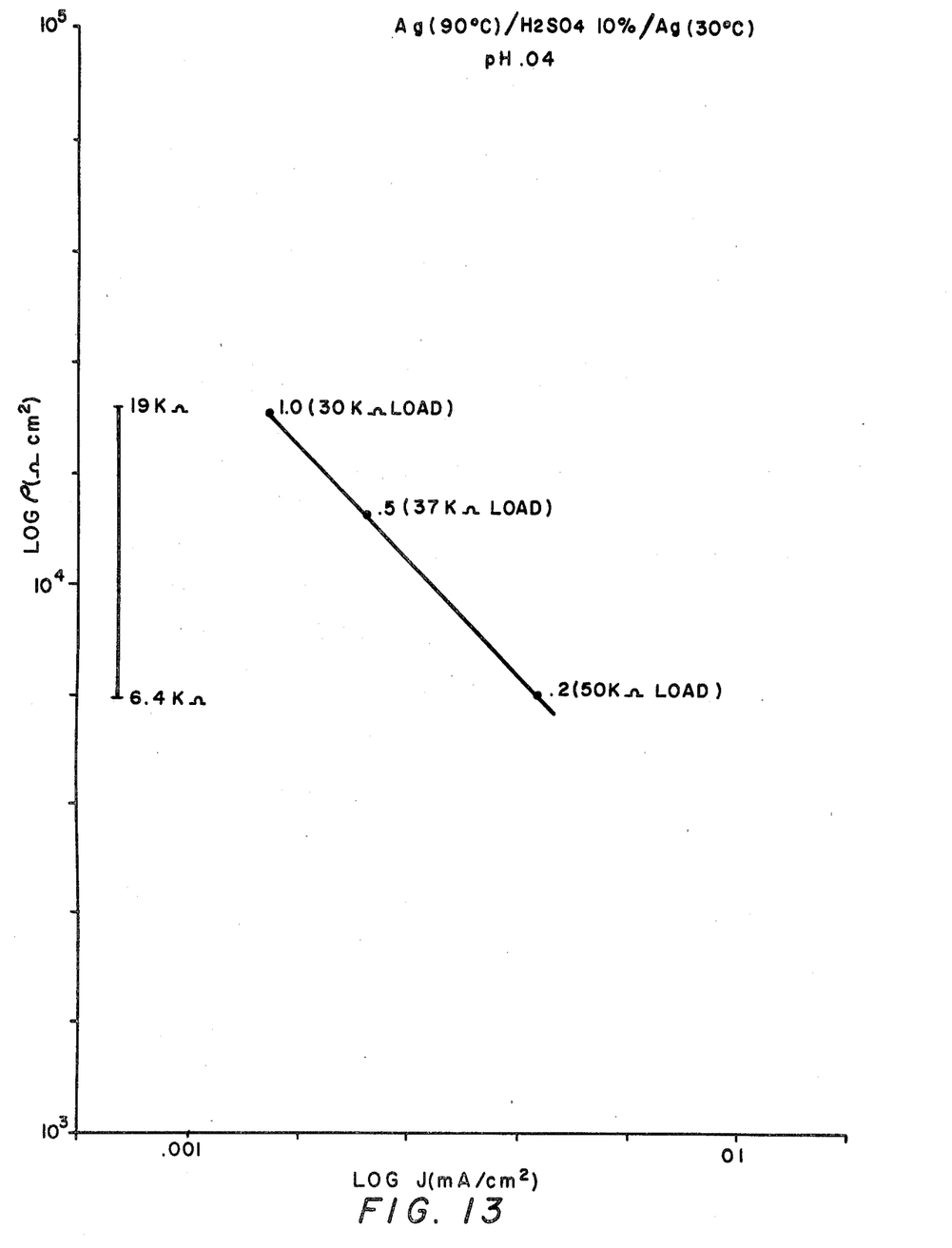
Figure 14:
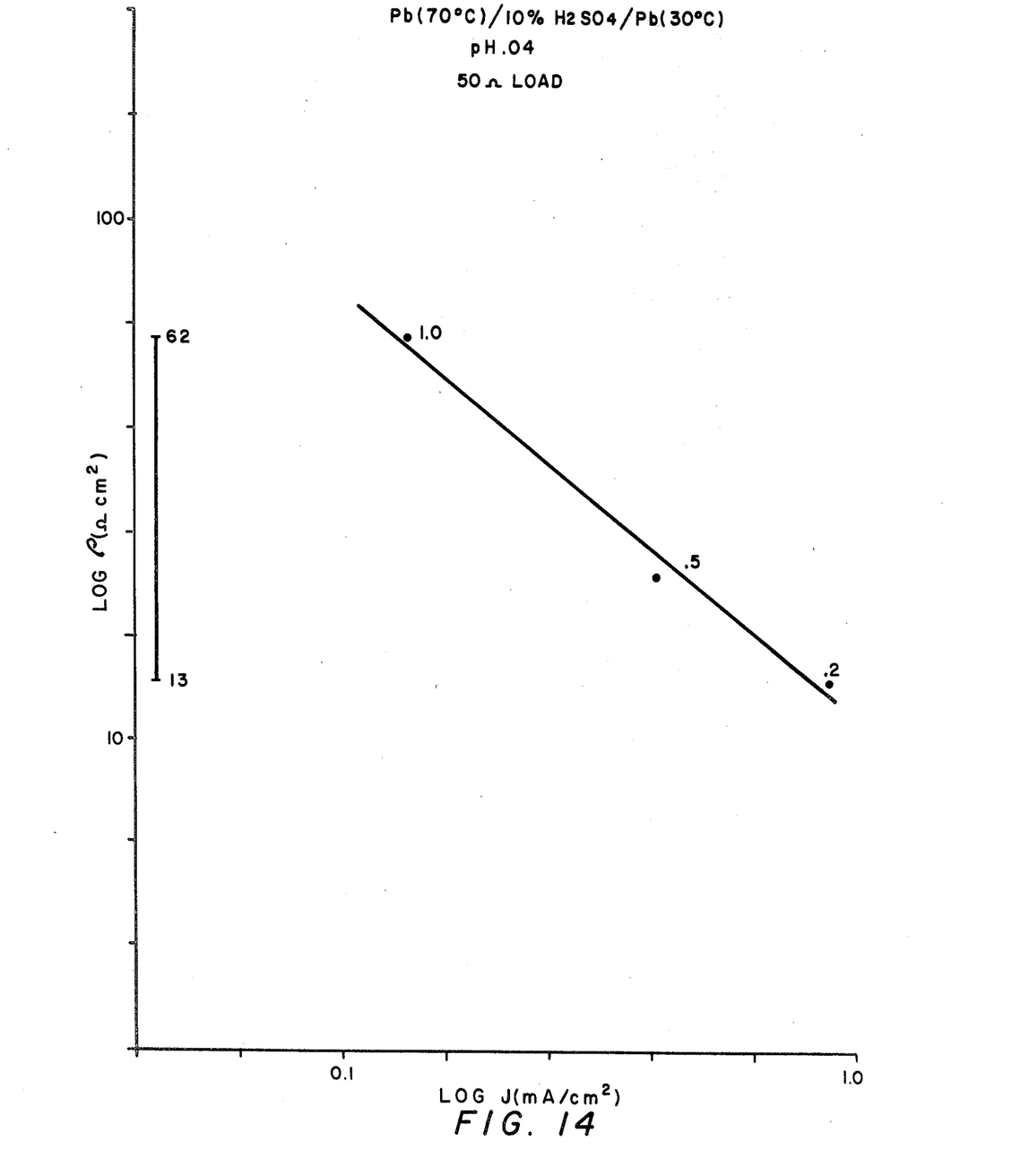
Figure 15:
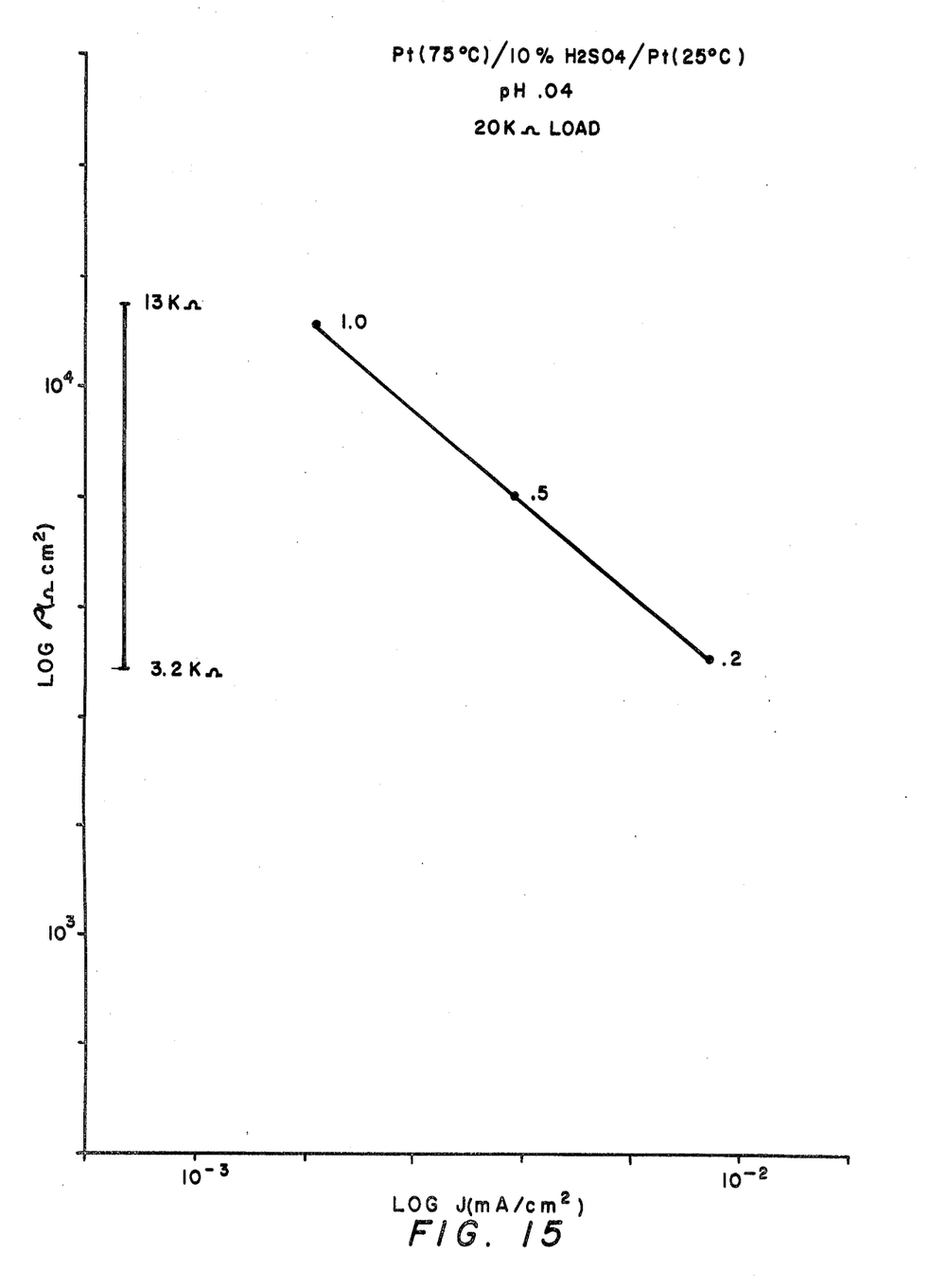

In order to demonstrate the improvement in thermal galvanic cell efficiency with decreasing electrode immersion depth, an experimental "bridge" cell, depicted schematically in FIG. 11, was constructed. In the arrangement of FIG. 11, the "hot" electrode 10 was heated by means of an electrical heater 28 along a first edge while the oppositely disposed edge was immersed in the electrolyte 16 in a first container 30. Container 30 was positioned on a hot plate 32 whereby the electrolyte temperature could be maintained at approximately 90° C. The "cold" electrode 12 was immersed in electrolyte 16 in a second container 34 and was maintained at ambient temperature. Both of electrodes 10 and 12 were connected to laboratory jacks so that the immersion depth, d, thereof could be varied. Communication between the electrolyte in containers 30 and 34 was established by means of a "bridge" conduit 36 whereby ion or electron flow between electrodes 10 and 12 was possible. In order to insure that there would be no temperature gradients along the surface of the "hot" electrode, the temperature of the electrode was measured immediately above the electrolyte surface and the electrolyte temperature was also measured. The current flow to heater 28 was adjusted to equalize the temperatures of the electrolyte and the expose end of the "hot" electrode 10. FIGS. 12-15 are plots, for various electrode and electrolyte materials, of cell "resistivity" vrs current density for varying electrode immersion depths. FIGS. 12-15 show that in each test the "resistivity" decreased and current density increased as the electrode immersion depth was decreased.

Referring again to FIGS. 7-10, the test results indicated as CASE 4' confirm that the combined effects of reducing electrode area through reduction in immersion depth and establishing a transverse temperature differential, $dT_2$, result in much improved electrode efficiency and thus improved power output. The reduction in the immersion dimension, d, decreases cell resistivity per unit of electrode area. The establishment of the transverse temperature gradient also results in the area perpendicular to the transverse temperature gradient becoming additive. Without the $dT_2$, addition of electrode length for a given immersion depth produces no significant increase in power output. Thus, by combining the decreased "resistivity" per unit area incident to reduction in immersion depth with establishment of a transverse temperature gradient, a thermal galvanic cell may become larger with a concomitant increase in output power. A practical operating cell which takes advantage of both of the aforementioned features is depicted in FIG. 5 and will be described below. Cells in accordance with the present invention have their electrolytes adjusted to be below pH 5 and preferably below pH 2.

To summarize the foregoing, the open circuit voltage of a thermal galvanic cell is, for cells of the same chemistry, equal to a constant multiplied by the temperature difference between the electrodes and the power output is inversely proportional to the internal resistance of the cell. If the internal resistance of a cell can be halved, by way of example, then the power output can be doubled. The practical design for an operating cell, accordingly, dictates obtaining the largest possible temperature gradient $dT_1$ between the electrodes while reducing the internal resistance as much as is economically feasible. The above test results demonstrate that internal resistance may be minimized by constructing the cells with a low dimension in the heat flow direction; i.e., the immersion depth, d; while simultaneously establishing a high transverse temperature gradient, $dT_2$.

Referring to FIG. 5, a cell may be constructed with a plurality of parallel "hot" and "cold" electrodes, respectively indicated at 10''' and 12''', supported by respective plates 40 and 42. Plates 40 and 42 are comprised of a material which may be both an electrical and a thermal insulator. The plates 40 and 42 separate a housing 44 into three separate compartments. A hot fluid is delivered, via conduit 46, into a first of these compartments 48 while a relatively cool fluid is delivered into a second compartment 50 via conduit 52. The fluids delivered to compartments 48 and 50 respectively deliver heat to electrodes 10''' and remove heat from electrodes 12'''. The space 54 between the electrodes will, of course, be filled with the electrolyte. The depth of immersion of the electrodes; i.e., the distance the electrodes protrude into space 54 from their respective supports 40 and 42, will be kept low and typically will be less than 0.3 cm. The separation between adjacent electrodes will typically be less than 1.5 cm. It will be understood that the electrodes could be of a comb-like construction whereby all of electrodes 10''' will be commoned by a bridging member which could be plate 40 and there would be a similar bridging member for electrodes 12'''. FIG. 5b shows that the length of the electrodes 10''' and 12''' is quite long when compared to the immersion depth.

It should also be noted that the electrolyte compartment of the cell of FIG. 5 can be divided in half by means of a barrier which serves to isolate the electrodes thermally to thereby increase the temperature differential $dT_1$. Such a thermal barrier may, for example, comprise an ion permeable membrane, such as Nafion or polyoxphenolic, which lowers the heat transfer as well as allowing the maintenance of two different concentrations of electrolyte within the cell for increased performance.

Referring to FIG. 6, the performance of a cell of the type depicted in FIG. 1 is enhanced by obtaining a series of thermal gradients $dT_2$ on the electrode by affixing a plurality of conduits 22' and 24' to the outwardly facing sides of electrodes 10 and 12. Conduits 22' and 24' respectively carry the heating and cooling fluids. In the FIG. 6 embodiment the cell can most economically be designed to have a rectangular shape with the tubes 22' and 24' being oriented parallelly with respect to one another. As indicated by the broken line 60 in FIG. 6, a membrane may be included within the cell to function as a barrier to heat transfer between electrodes 10 and 12.

While preferred embodiments have been shown and described, various modifications and substitutions may be made thereto without departing from the spirit and scope of the invention. Accordingly, the present invention has been described by way of illustration and not limitation.

What is claimed is:

1. A method of utilizing thermal energy comprising the steps of:
   filling at least a portion of the space between a pair of spacially displaced generally parallelly related conductive electrodes with a liquid electrolyte;
   including in the electrolyte a barrier material which impedes the establishment of thermal convection currents therein;
   establishing an average temperature differential between the electrolyte contacting facing surface areas of the electrodes;
   establishing a temperature gradient along at least a portion of the electrolyte contacting surface of at least one of the electrodes, said temperature gradient being in a direction which is transverse to said temperature differential; and
   establishing electrical contact with the electrodes whereby current may flow in a circuit including the electrodes and electrolyte.

2. The method of claim 1 wherein the electrodes are partly immersed in the electrolyte and wherein the established temperature gradient is in the direction of immersion.

3. The method of claim 2 further comprising:
immersing the electrodes into the electrolyte to a depth which is less than the electrode length in the electrolyte.

4. The method of claim 3 further comprising:
adjusting the pH of the electrolyte to be less than 5.

5. The method of claim 2 further comprising:
adjusting the pH of the electrolyte to be less than 5.

6. The method of claim 1 wherein the electrodes are partly immersed in the electrolyte and wherein said method further comprises:
immersing the electrodes into the electrolyte to a depth which is less than the electrode length in the electrolyte.

7. The method of claim 6 further comprising:
adjusting the pH of the electrolyte to be less than 5.

8. The method of claim 1 wherein the step of including a barrier material in the electrolyte comprises:
adding between 1 and 15% by weight of $SiO_2$ in particulate form to the electrolyte.

9. The method of claim 8 wherein the electrodes are partly immersed in the electrolyte and wherein the established temperature gradient is in the direction of immersion.

10. The method of claim 9 wherein the electrodes are partly immersed in the electrolyte and wherein said method further comprises:
immersing the electrodes into the electrolyte to a depth which is less than the electrode length in the electrolyte.

11. The method of claim 10 further comprising:
adjusting the pH of the electrolyte to be less than 5.

12. The method of claim 10 wherein the immersion depth is less than 1 cm and wherein said method further comprises:
adjusting the pH of the electrolyte to be less than 2.

13. The method of claim 9 further comprising:
adjusting the pH of the electrolyte to be less than 5.

14. The method of claim 8 wherein the electrodes are partly immersed in the electrolyte and wherein said method further comprises:
immersing the electrodes into the electrolyte to a depth which is less than the electrode length in the electrolyte.

15. The method of claim 14 further comprising:
adjusting the pH of the electrolyte to be less than 5.

16. The method of claim 8 further comprising:
adjusting the pH of the electrolyte to be less than 5.

17. The method of claim 1 further comprising:
adjusting the pH of the electrolyte to be less than 5.

18. The method of claim 1 wherein the step of establishing a temperature gradient comprises:
delivering heat to the said one electrode in at least one localized region, said region being of smaller area than the total electrode area in contact with the electrolyte.

19. The method of claim 18 wherein the heat is delivered to the electrode along an edge portion which is not in contact with the electrolyte.

20. The method of claim 19 wherein the electrodes are partly immersed in the electrolyte and wherein the delivery of heat causes a temperature gradient in the direction of immersion.

21. The method of claim 20 further comprising:
adjusting the pH of the electrolyte to be less than 2.

22. The method of claim 21 wherein the immersion depth of the electrodes in the electrolyte is less than the length thereof in contact with the electrolyte.

23. The method of claim 22 wherein the step of including a barrier material in the electrolyte comprises:
adding between 1 and 15% by weight of $SiO_2$ in particulate form to the electrolyte.

24. The method of claim 18 further comprising:
immersing the electrodes into the electrolyte to a depth which is less than the electrode length in contact with the electrolyte, the step of immersing the electrodes including maintaining the region at which heat is delivered thereto removed from contact with the electrolyte.

25. The method of claim 1 wherein the step of establishing a temperature gradient comprises:
delivering heat to the said one electrode in a plurality of localized regions, said regions being spacially separated and comprising less than the total electrode area in contact with the electrolyte.

* * * * *